US011326874B2

(12) United States Patent
Lee et al.

(10) Patent No.: US 11,326,874 B2
(45) Date of Patent: May 10, 2022

(54) STRUCTURED LIGHT PROJECTION OPTICAL SYSTEM FOR OBTAINING 3D DATA OF OBJECT SURFACE

(71) Applicant: MEDIT CORP., Seoul (KR)

(72) Inventors: Soo bok Lee, Seongnam-si (KR); Seung Jin Lee, Gunpo-si (KR); Eun Gil Cho, Gunpo-si (KR)

(73) Assignee: MEDIT CORP., Seoul (KR)

( * ) Notice: Subject to any disclaimer, the term of this patent is extended or adjusted under 35 U.S.C. 154(b) by 126 days.

(21) Appl. No.: 16/827,644

(22) Filed: Mar. 23, 2020

(65) Prior Publication Data

US 2021/0131798 A1 May 6, 2021

(30) Foreign Application Priority Data

Nov. 6, 2019 (KR) .......................... 10-2019-0140694

(51) Int. Cl.
 *G01B 11/25* (2006.01)
 *H04N 13/254* (2018.01)
 *G02B 19/00* (2006.01)

(52) U.S. Cl.
 CPC ........ *G01B 11/254* (2013.01); *G02B 19/0061* (2013.01); *H04N 13/254* (2018.05)

(58) Field of Classification Search
 CPC . G01B 11/254; G02B 19/0061; H04N 13/254
 See application file for complete search history.

(56) References Cited

U.S. PATENT DOCUMENTS

| 9,410,801 | B2 * | 8/2016 | Buchanan | .......... G01B 11/2527 |
| 9,915,827 | B2 * | 3/2018 | Gordon | .................. H04N 5/332 |
| 9,946,089 | B2 * | 4/2018 | Chen | ...................... F21V 5/004 |
| 10,353,215 | B2 * | 7/2019 | Chen | ...................... G06T 7/521 |

(Continued)

FOREIGN PATENT DOCUMENTS

| JP | 2002-286432 A | 10/2002 |
| JP | 2003-050112 A | 2/2003 |

(Continued)

OTHER PUBLICATIONS

Final office action dated Oct. 8, 2020 from Korean Intellectual Property Office for Korean Application No. 10-2019-0140694.

*Primary Examiner* — Boubacar Abdou Tchoussou
(74) *Attorney, Agent, or Firm* — Insight Law Group, PLLC; Seung Lee (57) ABSTRACT

A structured light projection optical system for obtaining 3D data of an object surface includes a structured light projection optical part configured to project a plurality of patterns onto an object or a screen, and an imaging optical part configured to obtain 3D data by photographing the patterns being projected from the structured light projection optical part. The structured light projection optical part includes a plurality of light sources, and a plurality of pattern masks. As the plurality of light sources are turned on and off, the pattern mask matches any one of the plurality of light sources illuminating a light, and the plurality of patterns are projected on the object or the screen by the pattern mask. Accordingly, various patterns can be effectively projected, real-time measurement can be easily performed through a quick pattern change, and the accurate 3D data can be obtained.

17 Claims, 8 Drawing Sheets

(56) References Cited

U.S. PATENT DOCUMENTS

| | | | |
|---|---|---|---|
| 10,489,925 B2* | 11/2019 | He | G06T 7/521 |
| 10,713,810 B2* | 7/2020 | Furihata | H04N 5/247 |
| 2003/0123707 A1* | 7/2003 | Park | G06K 9/00201 |
| | | | 382/106 |
| 2008/0024754 A1* | 1/2008 | Mack | G01S 17/46 |
| | | | 356/4.01 |
| 2014/0085424 A1* | 3/2014 | Buchanan | G01B 11/2527 |
| | | | 348/46 |
| 2016/0050401 A1* | 2/2016 | Gordon | G01B 11/2513 |
| | | | 348/744 |
| 2016/0150219 A1* | 5/2016 | Gordon | G06T 7/521 |
| | | | 348/46 |
| 2017/0115497 A1* | 4/2017 | Chen | F21V 5/008 |
| 2018/0005405 A1* | 1/2018 | Furihata | G06T 7/70 |
| 2019/0051004 A1* | 2/2019 | He | G01S 7/493 |
| 2019/0273908 A1* | 9/2019 | Gordon | H04N 13/271 |
| 2020/0333135 A1* | 10/2020 | Hong | G02B 21/00 |

FOREIGN PATENT DOCUMENTS

| | | |
|---|---|---|
| JP | 2004-053532 A | 2/2004 |
| KR | 10-2010-0011192 A | 2/2010 |
| KR | 10-2010-0023992 A | 3/2010 |
| KR | 10-1479734 B1 | 1/2015 |

\* cited by examiner

STRUCTURED LIGHT PROJECTION OPTICAL SYSTEM FOR OBTAINING 3D DATA OF OBJECT SURFACE

CROSS-REFERENCE TO RELATED APPLICATION

This application claims priority to Korean Patent Application No. 10-2019-0140694, filed on Nov. 6, 2019, the disclosure of which is incorporated herein by reference in its entirety.

BACKGROUND OF THE DISCLOSURE

Field of the Disclosure

The present disclosure relates to a structured light projection optical system for obtaining 3D data of an object surface, and more particularly, to a structured light projection optical system for obtaining three-dimensional (3D) data through a reflected light obtained by projecting a pattern onto an object.

Description of Related Art

In general, various methods exist to obtain 3D data based on 2D images. For example, it may be possible to obtain images of an object at various angles based on one camera and to obtain 3D data through the obtained images. Further, it may also be possible to obtain 3D data based on two or more cameras having a fixed relationship.

In such methods, a commonly used technology is to search for feature points for specifying the same portions of the objects in the respective obtained 2D images and to match the searched feature points. The accuracy and the quality of the 3D data may be determined depending on how accurately the feature points are obtained and how many feature points are obtained.

In order to obtain precise 3D data in the 3D measurement method using the structured light as described above, it is important to accurately obtain large amounts of object surface information. As the structured light being projected onto the object is further subdivided, larger amounts of 3D information can be obtained more accurately. In order to subdivide the structured light, a complicated micro pattern may be projected or a simple pattern may be projected several times. In order to subdivide the structured light, a method using one sheet of pattern and a method using a plurality of patterns may be used in accordance with the use purpose. In general, scan equipment for obtaining high-precision 3D data may obtain the 3D data using a plurality of patterns.

According to the method using the plurality of patterns, all the patterns have generally meanings related to one another through encoding of the patterns, and thus should be accurately projected on a 3D space. As a representative example, there is a method using "Gray Code" and "Phase Shift" patterns. According to this method, the boundary of lines in each pattern should be accurately projected, and an accurate shift should be performed in the domain. Further, in order to use the structured light, the respective patterns should be accurately aligned on the 3D space to be physically measured.

However, in the case of using the complicated micro structured light, a lot of time is consumed for an operation. Further, because the structured light should be irradiated onto the object surface for a long time, the real-time measurement is restricted.

Researches for an efficient structured light projection system capable of reducing the time as described above are in progress.

In the structured light projection system, a spatial light modulator for changing the shape of the pattern in one optical system or a diffraction element using a laser light source may be used, and further, a method adopting a pattern mask and various driving parts may be used.

Although the spatial light modulator has the advantage of creating diverse complicated patterns in a comparatively short time through creation of the patterns in the unit of pixels, a separate control circuit should be configured, and the spatial utility may deteriorate due to the limited optical structure.

According to the method utilizing the laser light source and the diffraction element, a diffraction pattern is created by the diffraction characteristic of light. In accordance with the structure of the diffraction element, a pattern in the form of a stripe or a concentric circle is created. In order to create a pattern of a composite shape, a diffraction element having a special structure should be manufactured. Further, in order to create the diffraction pattern, a light source having a good coherence, such as a laser, should be used, and this causes the cost to be greatly increased. Because the diffraction pattern is in a determined pattern shape, transformation of the diffraction pattern is limited.

Because the method using the driving parts requires a separate control circuit and a separate driving part for each device, the projection system is sensitive to an external impact, and there is difficulty in spatial utility due to the volume caused by the separate control circuit or the plurality of driving parts.

Further, in order to solve the problem of the method utilizing the driving parts, the 3D data may be obtained using a single pattern through usage of a single LED and a pattern mask. However, such a method using the single LED and the single pattern mask has the problem that it takes a long time in obtaining the 3D data as compared with the method using the plurality of patterns.

RELATED ART DOCUMENT

[Patent Document]
Korean Registered Patent Publication No. 10-1479734 (Published on Jan. 6, 2015)

SUMMARY OF THE DISCLOSURE

The present disclosure is intended to solve the above problems, and an object of the present disclosure is to provide a structured light projection optical system having an optical structure capable of projecting patterns by being configured to create a plurality of patterns spatially aligned using an LED array light source and a pattern mask.

The technical subject matters of the present disclosure are not limited to those as described above, and other unmentioned technical subject matters will be able to be clearly understood by those skilled in the art from the following descriptions.

In an embodiment of the present disclosure to achieve the above object, a structured light projection optical system is configured to create and project a plurality of patterns spatially aligned using a plurality of light sources and a pattern mask without a separate driving part.

The present disclosure is configured to project various aligned patterns on an object only by a sequential on/off operation of aligned LED light sources.

A structured light projection optical system according to the present disclosure includes a structured light projection optical part configured to project a plurality of patterns onto an object or a screen; and an imaging optical part configured to obtain 3D data by photographing the patterns being projected from the structured light projection optical part, wherein the structured light projection optical part includes a plurality of light sources; and a plurality of pattern masks, wherein as the plurality of light sources are turned on and off, the pattern mask matches any one of the plurality of light sources illuminating a light, and the plurality of patterns are projected on the object or the screen by the pattern mask.

The structured light projection optical system according to the present disclosure can project the patterns by being configured to be able to create the plurality of patterns spatially aligned using the LED array light source and the pattern mask without any separate driving part.

Through the use of the LED array light source and the pattern mask, the present disclosure can project diverse patterns on the object without any separate driving part or control circuit excluding the light source.

The present disclosure can easily change the optical structure by means of the pixel structure and operation mechanism.

The present disclosure can project the spatially aligned patterns by controlling the plurality of LED light sources through the proposed optical structure.

The present disclosure can quickly change and project the patterns with a simple light source control, and thus real-time implementation and real-time measurement are facilitated.

The present disclosure can promptly secure precise data through the on/off of the plurality of LEDs.

The present disclosure can be easily miniaturized by minimizing the volume through resolving of the spatial limitations due to the driving part or control circuit.

The present disclosure has a simple optical structure and thus can simplify the optical component configuration.

DESCRIPTION OF SPECIFIC EMBODIMENTS

The aspects and features of the present disclosure and methods for achieving the aspects and features will be apparent by referring to the embodiments to be described in detail with reference to the accompanying drawings. However, the present disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures. The control configuration according to the present disclosure may be configured by at least one processor.

Figure 1:
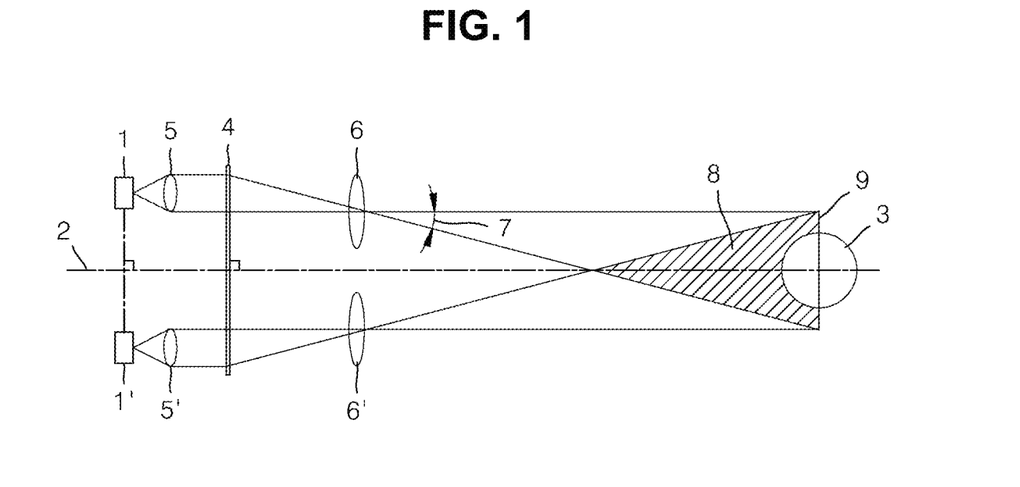
FIG. 1 is a diagram illustrating an optical structure in accordance with a 3D measurement of a structured light projection optical system according to an embodiment of the present disclosure.

FIG. 1 is a diagram illustrating an optical structure in accordance with a 3D measurement of a structured light projection optical system according to an embodiment of the present disclosure.

A structured light projection optical system for obtaining 3D data includes a structured light projection optical part and an imaging optical part.

As illustrated in FIG. 1, the structured light projection optical system according to an embodiment of the present disclosure is composed of an optical structure capable of obtaining 3D data of an object surface.

The structured light projection optical part radiates a structured light having a pattern, and thus the structured light is projected on a screen. The structured light projection optical part makes the structured light be projected on the surface of an object intended to be measured.

In the structured light projection optical system, the structured light projection optical part includes a plurality of light sources 1 and 1', a plurality of pattern masks 4, and a plurality of lenses 5, 5', 6, and 6'.

The light source 1 and 1' may be a laser diode (LD) or a light emitting diode (LED). As the light source, an LED light source may be used. Further, the light source may be formed through arrangement of a plurality of LEDs.

Further, as compared with other light sources, the laser light is superior by far in monochromaticity, straightness, and connection characteristics, and thus can perform precise distance measurement.

The plurality of light sources 1 and 1' may be disposed to form a predetermined relative arrangement.

The plurality of light sources 1 and 1' may be disposed in accordance with a texture direction of the pattern formed on the pattern mask. If the texture of the pattern is formed in a vertical direction, the plurality of light sources 1 and 1' are vertically disposed, whereas if the texture of the pattern is formed in a horizontal direction, the plurality of light sources 1 and 1' are horizontally disposed.

The plurality of light sources 1 and 1' are arranged in a line on a tangential plane.

Further, the structured light projection optical part may further include a light source controller configured to control the light sources to be turned on or off. The light source controller controls the plurality of light sources to be sequentially turned on or off in a specific order. The light source controller controls flickering by controlling a power being supplied to the light sources.

The pattern mask 4 has a pattern formed on the surface of the mask and projects the pattern through penetration of the light radiated from the light source.

One pattern mask 4 may be provided to project the pattern onto a space or an object through penetration of the light radiated from the first light source 1 and the second light source 1'.

The pattern mask 4 may be configured as an integrated pattern mask on which a plurality of patterns are formed.

The pattern mask 4 may project the patterns that match the light sources among the plurality of patterns if the light of the first light source 1 and the second light source 1' penetrates the pattern mask 4, respectively.

Further, a plurality of pattern masks may be provided. The pattern masks may be composed of the plurality of pattern masks on which different patterns are respectively formed in a manner that one pattern is formed on one pattern mask.

The plurality of pattern masks may be penetrated by the light of the first light source 1 and the second light source 1', respectively. The plurality of pattern masks may project patterns of different shapes in accordance with the light sources, respectively.

The plurality of pattern masks may be spatially arranged to project the patterns.

The lenses include the condensing lens 5 and the projection lens 6. The plurality of condensing lenses and projection lenses are provided.

The first condensing lens 5 and the first projection lens 6 condense and project the light of the first light source 1. The second condensing lens 5' and the second projection lens 6' condense and project the light of the second light source 1'.

The condensing lenses 5 and 5' are electronic lenses acting as convex lenses being used to gather the radiated light. The projection lenses 6 and 6' are used to enlarge images formed by other lenses again.

A single lens or a group (set) of a plurality of lenses combined with each other may be used as the condensing lens and the projection lens.

Further, the second projection lenses 6 and 6' may be implemented through a removal of a portion thereof or a change of the shape so that the axis arrangement of the patterns can be accurately implemented.

Accordingly, if the light source is a horizontal array LED, the axis arrangement of the patterns can be accurately performed in accordance with the configuration of the condensing lens and the projection lens.

The light emitted from the first light source 1 is radiated on the pattern mask 4 through the first condensing lens 5. An image of the pattern mask 4 is formed on a screen 9 as much as a projection angle of view 7 by the first projection lens 6. A pattern effective region 8 is a part of the projection angle of view projecting on the object.

Further, the light emitted from the second light source 1' is illuminated on the pattern mask 4 through the second condensing lens 5'. An image of the pattern mask 4 is formed on the screen 9 as much as a projection angle of view 7 by the second projection lens 6'.

The pattern effective region 8 is a projection region in which the respective patterns overlap each other and a measurement target is located. The pattern effective region 8 is a region in which the respective patterns formed by the first light source 1 and the second light source 1' overlap each other.

Further, the structured light projection optical part may configure an offset between the projection lens and the pattern mask.

The structured light projection optical part can minimize a difference in size between the screen 9 on which the patterns are projected and the pattern effective region 8, and through this, it can improve projection light efficiency.

By configuring the offset, the structured light projection optical part can adjust the range of the pattern projected from the projection lens onto the screen or the object.

If a structured light of a specific pattern is projected on the screen by the structured light projection optical part, the structured light projection optical system obtains the 3D data through photographing of the projected light by the imaging optical part.

In particular, the structured light projection optical system can obtain the 3D data of the object by analyzing the shape of the structured light through projecting of the structured light on the surface of the object that is the target of measurement by the structured light projection optical part and photographing thereof through the imaging optical part.

Figure 2:
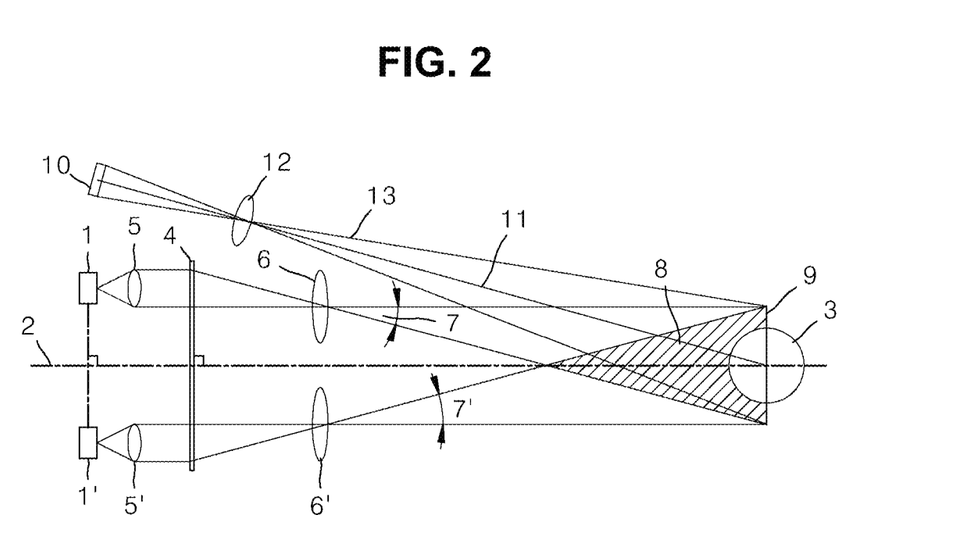
FIG. 2 is a diagram illustrating the configuration of a structured light projection optical system according to an embodiment of the present disclosure.

FIG. 2 is a diagram illustrating the configuration of a structured light projection optical system according to an embodiment of the present disclosure.

As illustrated in FIG. 2, the structured light projection optical system includes the structured light projection optical part and the imaging optical part as described above.

The imaging optical part obtains the 3D data by photographing the structured light projected on the screen or the object.

The imaging optical part includes an imaging lens 12 and an image sensor 10.

An imaging angle of view 13 is formed by the imaging lens 12, and an optical axis 11 of the imaging lens is put to make a diagonal line with a center axis 2 of the optical system.

The imaging optical part may obtain an image of the structured light pattern radiated onto the surface. The imaging optical part obtains the image formed on the image sensor to which a pattern light incident to an actual space is actually input.

The image sensor is a device converting an optical image into an electrical signal, and is composed of a chip in which a plurality of photodiodes are integrated. For example, one photodiode can form one pixel.

By an image formed on the chip through the light having passed through the lens, charge is accumulated in each pixel, and the accumulated charge is converted into an electrical signal (e.g., voltage).

As the image sensor, a charge coupled device (CCD) or a complementary metal oxide semiconductor (CMOS) may be used.

The imaging optical part may store the obtained 3D data in a provided memory (not illustrated).

Further, the imaging optical part may include a digital signal processor (DSP) configuring an image based on the signals output from the photodiodes. The digital signal processor can create a still image and a moving image composed of frames of still images.

The structured light projection optical system may obtain the 3D data of the object surface using a triangulation method.

The triangulation method is one of 3D measurement principles for obtaining the 3D data of the object surface from the relationship between an object and two image sensors or the relationship between one image sensor and one projector.

The structured light projection optical system may use two image sensors, or may be composed of at least one image sensor and a projector. The projector is the structured light projection optical part, and the image sensor is an image sensor provided in the imaging optical part.

The pattern may improve the accuracy in creating a corresponding point.

If a plurality of light sources are used, the structured light projection optical system may arrange the light sources in accordance with the shape of the pattern mask.

If the pattern mask is vertically long, the plurality of light sources are vertically arranged, and if the pattern mask is horizontally long, the respective light sources are horizontally arranged. Accordingly, the respective light sources are aligned with the pattern mask to project the pattern. Further, the structured light projection optical part minimizes the difference in size between the screen 9 on which the pattern is projected and the pattern effective region 8 by offsetting the first and second projection lenses 6 and 6' up and down from the respective pattern masks. Accordingly, the structured light projection optical part can improve the projection light efficiency.

Figure 3:
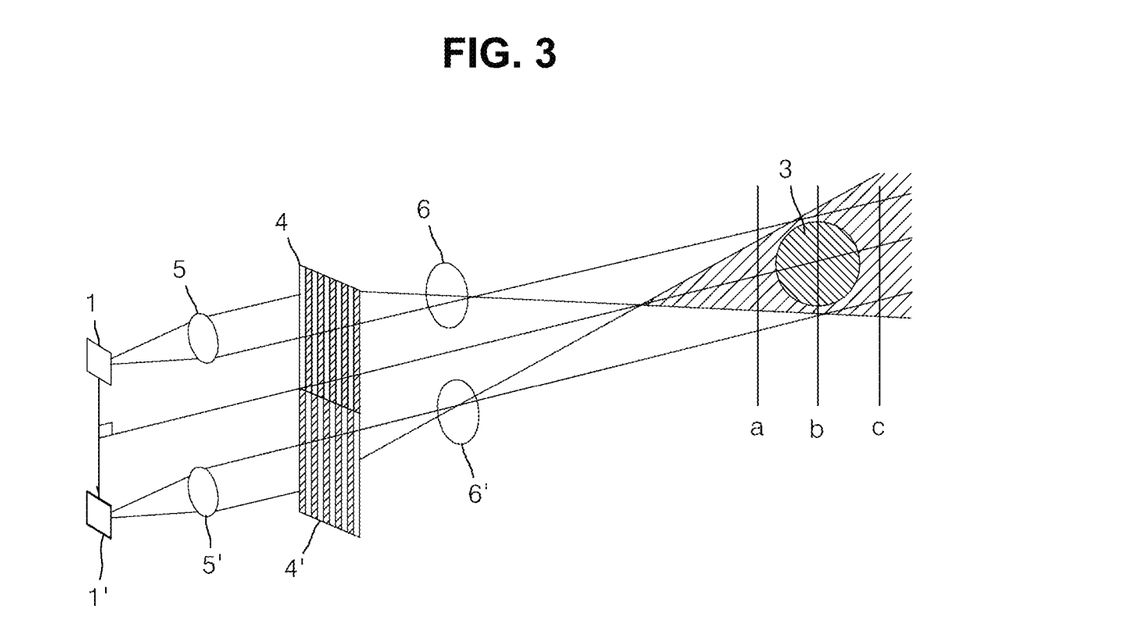
FIG. 3 is a diagram illustrating another example of pattern projection of a structured light projection optical system according to an embodiment of the present disclosure.

FIG. 3 is a diagram illustrating another example of pattern projection of a structured light projection optical system according to an embodiment of the present disclosure.

As illustrated in FIG. 3, the structured light projection optical part creates accurate corresponding points by projecting a plurality of pattern images on an object using a plurality of light sources. The usage of the plurality of pattern images enables the corresponding points to be created more accurately in comparison with the usage of one pattern image.

The structured light projection optical part may project the plurality of pattern images on the object using the plurality of pattern masks forming different patterns. Further, the structured light projection optical part may project the plurality of pattern images on the object using one integrated pattern mask in which a plurality of patterns are formed. The patterns formed on the pattern mask are projected onto the object or a space to form the pattern images. In the case where the structured light projection optical part projects two or more pattern images, the imaging optical part can easily find the corresponding points from the pattern images formed on the object surface and thus can obtain the 3D data.

If two or more pattern images are projected, the imaging optical part can create many corresponding points more accurately, and thus can obtain the 3D data having a high definition using the many corresponding points.

In the case of measuring the 3D data in real time, the structured light projection optical system can measure a moving object in addition to a fixed object. In particular, in the case of measuring the 3D data in real time, the system obtains the 3D data while moving the equipment, and thus it is required to obtain necessary images in a short time or in a limited time.

Accordingly, in order to configure a large number of corresponding points with a high accuracy in a short time, the structured light projection optical system is configured to project the plurality of pattern images. The imaging optical part obtains the 3D data by photographing the surface of the object including the plurality of pattern images projected by the structured light projection optical part.

By sequentially turning on/off the plurality of light sources 1 and 1', that is, the first light source and the second light source, the structured light projection optical part projects the pattern images corresponding to the respective patterns on the object through making a group of the first light source and the first pattern mask and a group of the second light source and the second pattern mask. As described above, the structured light projection optical part can replace the role of a driving part or a spatial light modulator by turning on/off the LED light sources.

Accordingly, the structured light projection optical part can project two or more patterns on the object by controlling the on/off of the light sources without a separate complicated driving part or spatial light modulator.

Further, if the light source is the LED array light source composed of a plurality of LEDs, the structured light projection optical part may project the first pattern on the object through matching of the first light source and the first pattern mask by sequentially turning on/off the individual LEDs or LED groups. Further, the structured light projection optical part may project the second pattern on the object through matching of the second light source and the second pattern mask.

Accordingly, the structured light projection optical part can project the plurality of patterns on the object through the on/off control of the plurality of light sources.

The pattern mask 4 may be formed of stripe or sinusoidal patterns, and such patterns may have texture directions. Accordingly, the structured light projection optical part is disposed so that the arrangement directions of the light sources coincide with each other with respect to the patterns having the texture directions. Further, the structured light projection optical part is disposed so that the light source arrangement and the pattern texture direction are in a vertical relationship with a surface including the imaging sensor, the object, and the center axis of the system.

Figure 4:
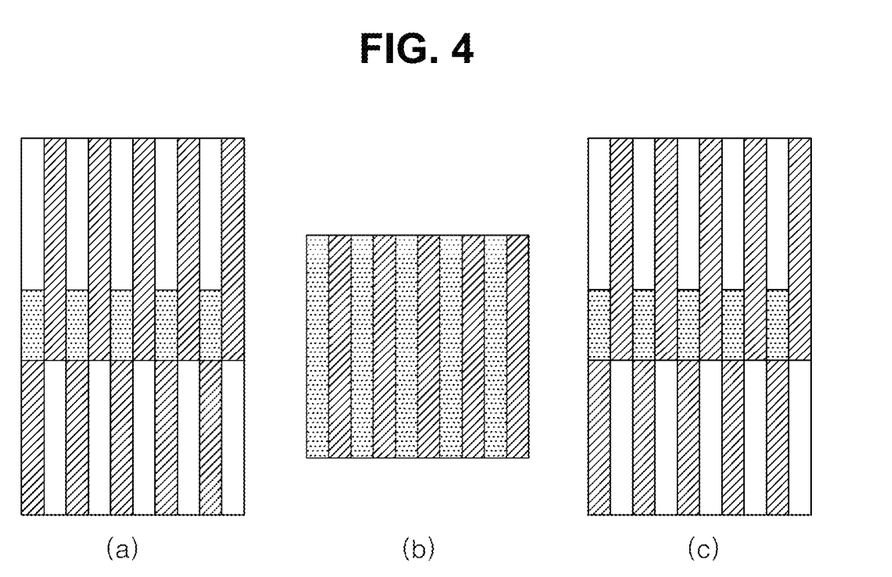
FIG. 4 is a diagram illustrating pattern projection images of FIG. 3.

FIG. 4 is a diagram illustrating pattern projection images of FIG. 3.

As illustrated in FIG. 4, pattern images are projected on an object.

The pattern images being projected on the object as illustrated in FIG. 3 have predetermined pattern images at points a, b, and c, respectively.

The pattern images may be projected on the object or the space by the pattern mask through the light of the first light source and the light of the second light source to form corresponding points.

The structured light projection optical part arranges a plurality of light sources without a driving part or a spatial light modulator, and uses the pattern mask. Further, the structured light projection optical part may project a plurality of patterns on the object through the on/off operation of the light sources.

The pattern mask may be composed of one integrated pattern mask including a plurality of patterns. Patterns may be disposed on the pattern mask so that the plurality of patterns match the respective specific light sources.

Further, a plurality of pattern masks 4 and 4' composed of different shapes of patterns may be used as the pattern masks, respectively. The plurality of pattern masks are disposed so that the respective pattern masks match the specific light sources.

The light emitted from the light sources 1 and 1' is illuminated on the pattern masks 4 and 4' through the condensing lenses 5 and 5' with a uniform illumination distribution. The light penetrating the pattern masks 4 and 4' projects stripe or sinusoidal patterns on the screen 9 or the object 3 by the projection lenses 6 and 6'.

As the first light source 1 and the second light source 1' are constantly arranged with each other and are aligned corresponding to the respective pattern masks, the patterns being projected by the respective light sources can be accurately aligned in a region where the patterns overlap each other.

Figure 5:
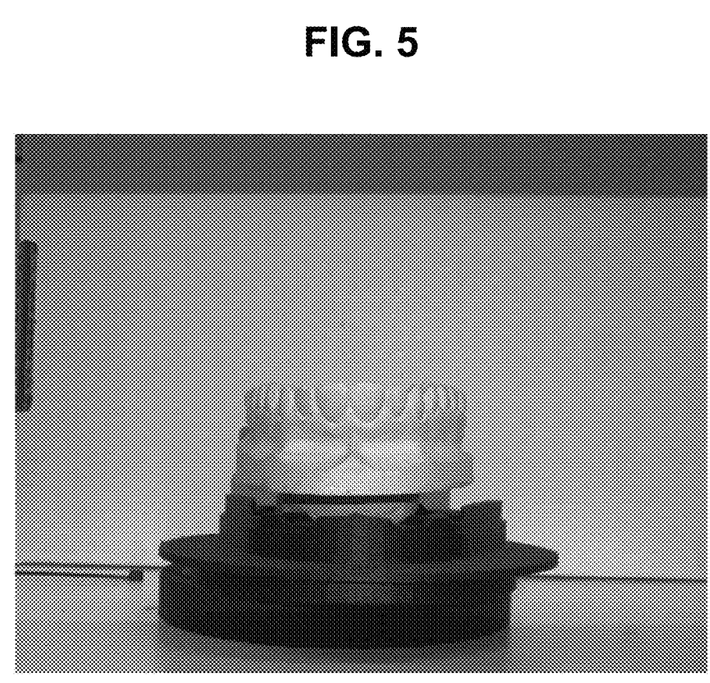
FIG. 5 is a diagram illustrating an object used to explain the pattern projection of a structured light projection optical system according to an embodiment of the present disclosure.

FIG. 5 is a diagram illustrating an object used to explain the pattern projection of a structured light projection optical system according to an embodiment of the present disclosure.

As illustrated in FIG. 5, the structured light projection optical system can obtain a 3D image of an object by projecting patterns on the object.

For example, in the case of a teeth model, accuracy is preferentially considered so that a patient uses the model without foreign body sensation or inconvenience, and thus it is necessary to obtain a more accurate 3D image.

The structured light projection optical system according to the present disclosure can obtain 3D images of various objects in addition to the teeth model as illustrated.

Hereinafter, pattern projection will be described in a state where the teeth model is exemplified.

Figure 6:
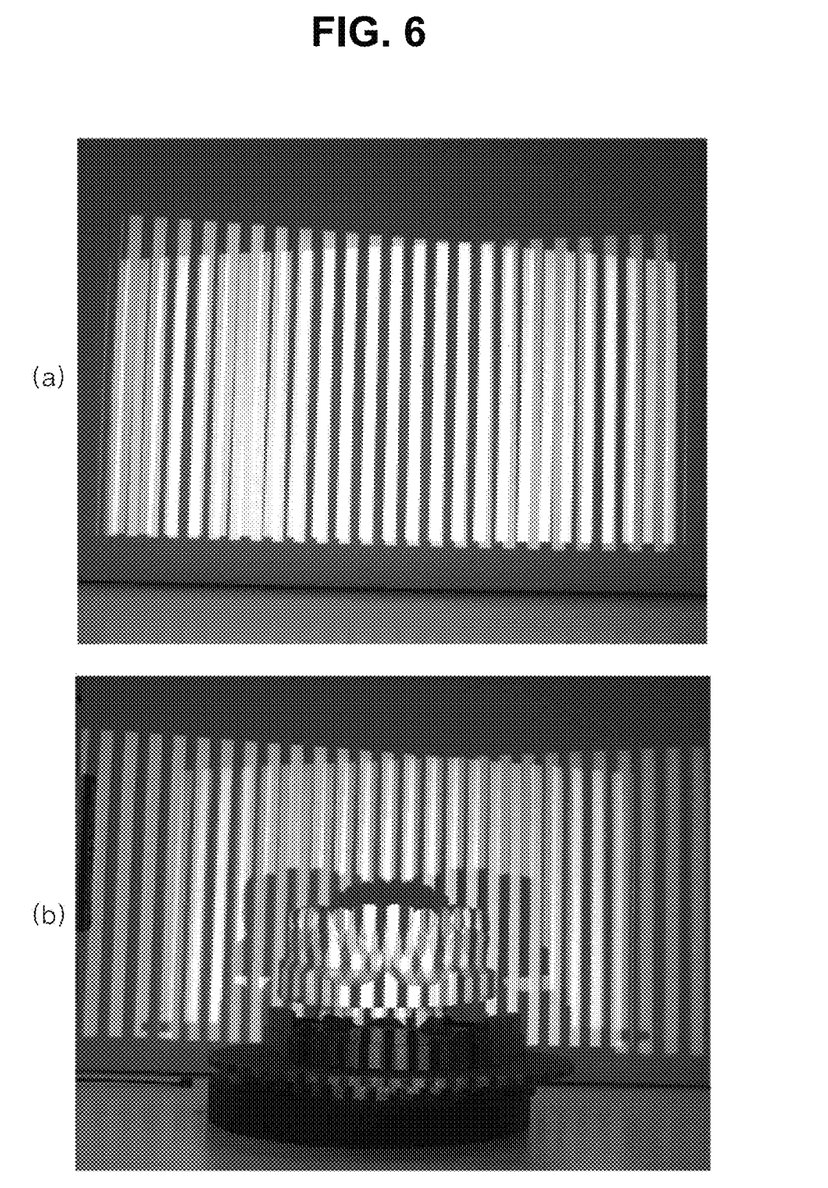
FIG. 6 is a diagram illustrating an example in which patterns are projected on the object of FIG. 5 by non-aligned light sources.

FIG. 6 is a diagram illustrating an example in which patterns are projected on the object of FIG. 5 by non-aligned light sources.

In FIG. 6, (a) shows an example in which patterns are projected on a screen without an object, and (b) shows an example in which patterns are projected on the teeth model of FIG. 5.

As illustrated in FIG. 6, in the case where patterns are projected from light sources having different non-aligned axes, boundary lines of the patterns are not aligned as shown in (a) of FIG. 6 although the light sources operate sequentially.

Accordingly, it may be difficult to obtain an accurate shape of the object from the pattern images.

In particular, as shown in (b) of FIG. 6, in the case of projecting patterns on the object using non-aligned light sources, in contrast with the original purpose to determine the shape of the object by means of the patterns, a pattern interference occurs, and it becomes difficult to find the corresponding points on the patterns.

As illustrated, if the texture direction of the pattern and the arrangement of the light sources do not coincide with each other, a pattern overlapping or interference phenomenon may occur due to the angle of view of projection lenses. The pattern overlapping phenomenon causes difficulty in finding coincident points, and thus accuracy is decreased.

Figure 7:
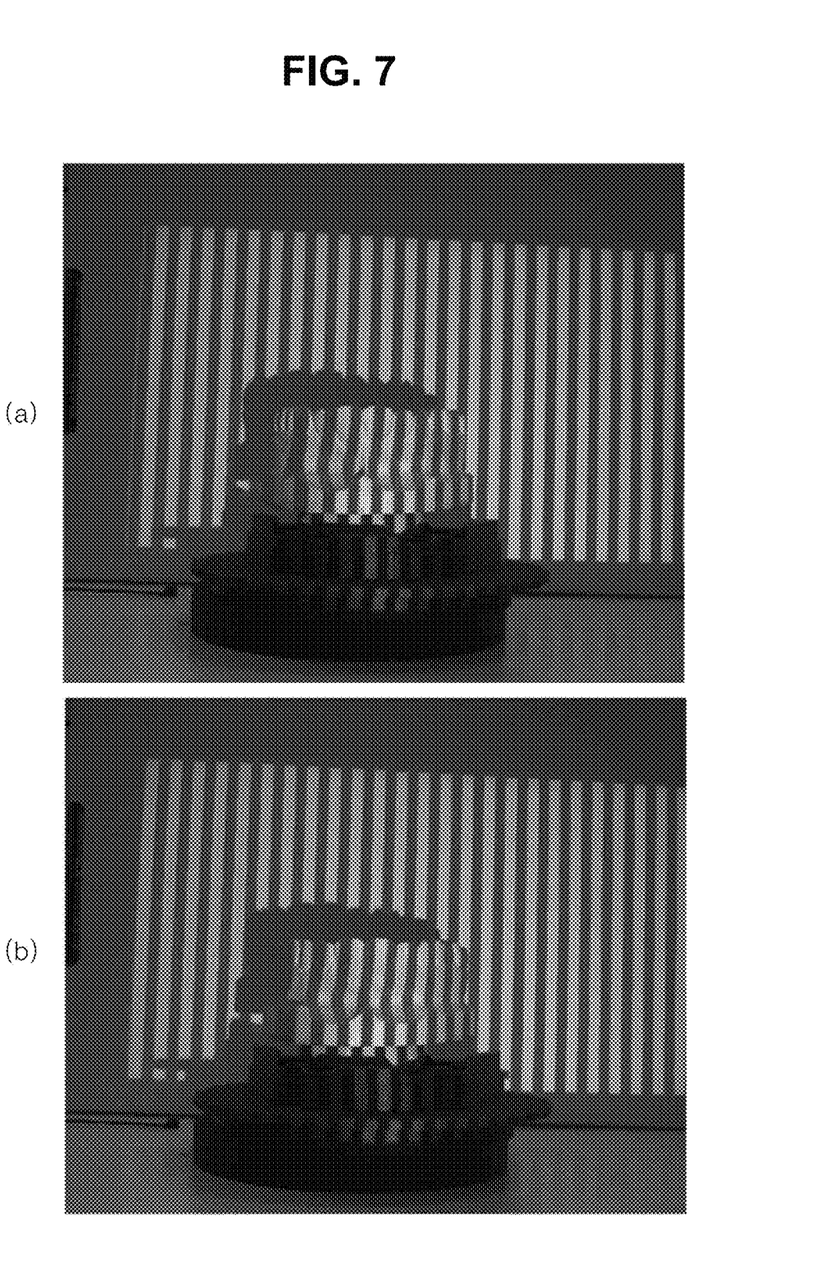
FIG. 7 is a diagram illustrating an example in which patterns are projected on the object of FIG. 5 by individual light sources of a structured light projection optical system according to an embodiment of the present disclosure.
Figure 8:
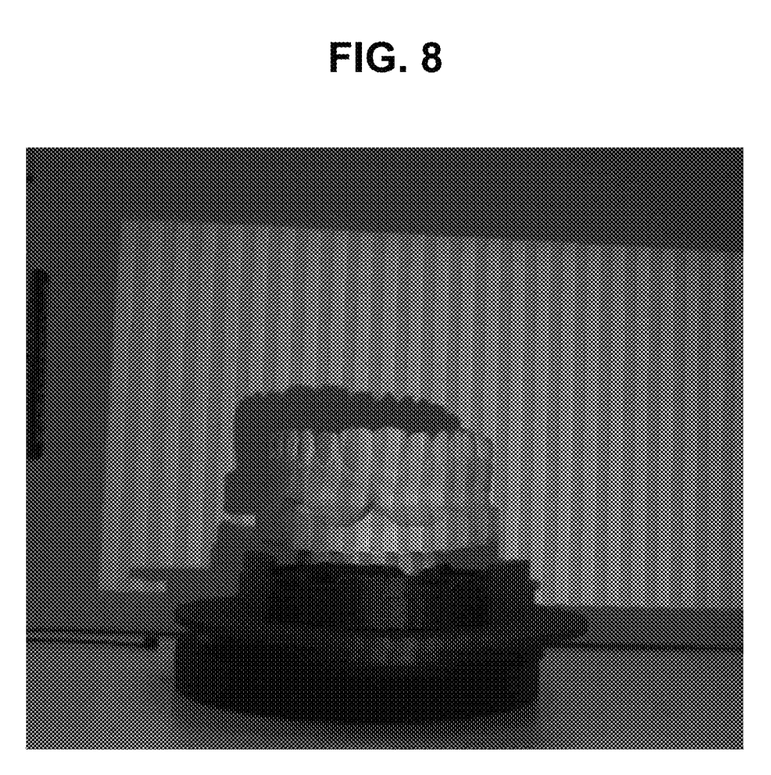
FIG. 8 is a diagram illustrating an example in which patterns of a structured light projection optical system according to an embodiment of the present disclosure are projected on the object of FIG. 5.

FIG. 7 is a diagram illustrating an example in which patterns are projected on the object of FIG. 5 by individual light sources of a structured light projection optical system according to an embodiment of the present disclosure, and FIG. 8 is a diagram illustrating an example in which patterns of a structured light projection optical system according to an embodiment of the present disclosure are projected on the object of FIG. 5.

As illustrated in FIG. 7, in the case of operating a plurality of light sources, respectively and projecting patterns on an object, the patterns are projected on the object by the respective light sources as illustrated in (a) and (b) of FIG. 7.

In FIG. 7, (a) shows a pattern being projected by a first light source, and (b) shows a pattern being projected by a second light source.

As shown in (a) and (b) of FIG. 7, as the first light source and the second light source are spatially aligned, effects occur as if the patterns are changed and projected on one optical axis.

In the case of sequentially cross-operating the first and second light sources at predetermined time intervals, the light sources are turned on/off, and as illustrated in FIG. 8, the pattern by the first light source and the pattern by the second light source are projected on the object.

In this case, axes of the first light source and the second light source are spatially arranged and aligned on the pattern masks corresponding to the light sources, the pattern being projected by the first light source and the pattern being projected by the second light source can be accurately aligned in a region in which the patterns overlap each other.

According to the structured light projection optical part, even if a plurality of first light sources radiate light using different pattern masks, the patterns being projected on the object appear to be aligned as illustrated.

According to the structured light projection optical part, the projected patterns accurately coincide with each other in a space, and thus boundaries of the patterns can accurately coincide with each other.

Accordingly, the imaging optical part can easily find the corresponding points from the pattern images formed on the object surface, and thus can obtain the 3D data.

The structured light projection optical system according to the present embodiment that operates as above can be implemented in the form of an independent hardware device, and may be driven in the form included in another hardware device, such as a microprocessor or a general purpose computer system, as at least one processor.

The foregoing explanation is merely an exemplary explanation of the technical idea of the present disclosure, and it should be understood by those of ordinary skill in the art to which the present disclosure pertains that various corrections and modifications can be made within a range that does not deviate from the essential features of the present disclosure.

Accordingly, embodiments disclosed in the specification and drawings are merely used to present specific examples to easily explain the contents of the present disclosure and to help understanding, but are not intended to limit the scope of the present disclosure. Accordingly, the scope of the present disclosure should be interpreted by the claims to be described below, and all technical concepts within the equivalent scope should be interpreted to be included in the scope of the present disclosure.

What is claimed is:

1. A structured light projection optical system comprising:
 a structured light projection optical part configured to project a plurality of patterns onto a projection space; and
 an imaging optical part configured to obtain 3D data by photographing the patterns being projected from the structured light projection optical part,
 wherein the structured light projection optical part includes:
 a plurality of light sources; and
 at least one pattern mask corresponding to the plurality of light sources,
 wherein as the plurality of light sources are turned on or off, the pattern mask matches any one of the plurality of light sources illuminating a light, and the plurality of patterns are projected onto the projection space by the pattern mask,
 wherein the structured light projection optical part further comprises:
 a condensing lens disposed between the light source and the pattern mask; and a projection lens configured to project the light passing through the pattern mask onto the projection space, and wherein the structured light projection optical part further comprises an offset provided between the projection lens and the pattern mask and configured to adjust a direction or a size of a region in which the pattern is projected onto the projection space.

2. The structured light projection optical system of claim 1, wherein the pattern mask is an integrated pattern mask in which a first pattern and a second pattern having a shape different from the shape of the first pattern are formed.

3. The structured light projection optical system of claim 2, wherein if a first light source among the plurality of light sources illuminates a light, the structured light projection optical part matches the first pattern of the pattern mask and projects the first pattern onto the projection space, whereas if a second light source illuminates a light, the structured light projection optical part matches the second pattern of the pattern mask and projects the second pattern onto the projection space.

4. The structured light projection optical system of claim 3, wherein the pattern mask forms the first pattern and the second pattern as the first light source and the second light source are turned on or off.

5. The structured light projection optical system of claim 1, wherein the pattern mask comprises a first pattern mask on which a first pattern is formed and a second pattern mask which has a shape different from the shape of the first pattern and on which a second pattern is formed.

6. The structured light projection optical system of claim 5, wherein if a first light source among the plurality of light sources illuminates a light, the structured light projection optical part matches the first pattern mask and projects the first pattern onto the projection space, whereas if a second light source illuminates a light, the structured light projection optical part projects the second pattern onto the projection space through the matched second pattern mask.

7. The structured light projection optical system of claim 5, wherein the first pattern mask and the second pattern mask are arranged in a space and project the patterns onto the projection space.

8. The structured light projection optical system of claim 1, wherein the pattern mask comprises a plurality of patterns corresponding to the number of the plurality of light sources.

9. The structured light projection optical system of claim 1, wherein the plurality of light sources are arranged in a line on a tangential plane.

10. The structured light projection optical system of claim 1, wherein the plurality of light sources are disposed in accordance with a texture direction of the pattern formed by the pattern mask.

11. The structured light projection optical system of claim 10, wherein if the texture of the pattern is vertically formed, the plurality of light sources are disposed in a vertical direction, whereas if the texture of the pattern is horizontally formed, the plurality of light sources are disposed in a horizontal direction.

12. The structured light projection optical system of claim 1, wherein the plurality of light sources are LED array light sources.

13. The structured light projection optical system of claim 1, wherein the plurality of light sources are sequentially turned on and off.

14. The structured light projection optical system of claim 1, wherein the pattern mask creates stripe or sinusoidal patterns.

15. The structured light projection optical system of claim 1, wherein the structured light projection optical part is disposed so that an arrangement of the plurality of light sources and a texture direction of the pattern formed on the pattern mask are in a vertical relationship with a surface including center axes of the imaging optical part and an object disposed in the projection space.

16. The structured light projection optical system of claim 1, wherein the imaging optical part comprises:

an imaging lens; and an image sensor configured to obtain the 3D data by photographing the pattern being projected onto the projection space.

17. The structured light projection optical system of claim 16, wherein the imaging optical part is disposed so that an optical axis of the imaging lens makes a diagonal line with a center axis of the structured light projection optical part.

* * * * *